Feb. 2, 1926.

J. SAMSON 1,571,804

VEHICLE WHEEL

Filed Jan. 8, 1924

Inventor
Jeronimo Samson
By Lancaster and Allwine
Attorneys

Feb. 2, 1926.                    1,571,804
J. SAMSON
VEHICLE WHEEL
Filed Jan. 8, 1924.       2 Sheets-Sheet 2

Inventor
Jeronimo Samson

Patented Feb. 2, 1926.

1,571,804

UNITED STATES PATENT OFFICE.

JERONIMO SAMSON, OF PASAY, RIZAL, PHILIPPINE ISLANDS.

VEHICLE WHEEL.

Application filed January 8, 1924. Serial No. 685,047.

*To all whom it may concern:*

Be it known that I, JERÓNIMO SAMSON, a citizen of the Philippine Islands, residing at Pasay, Rizal, Philippine Islands, have invented certain new and useful Improvements in Vehicle Wheels, of which the following is a specification.

This invention relates to improvements in vehicle wheel constructions.

The primary object of this invention is the provision of a novel type of resilient wheel embodying a novel principle of supporting a hub portion from a tire.

A further object of this invention is the provision of a relatively simple and durable type of vehicle wheel embodying a solid tire construction and a novel means of spring support for the same with respect to the hub of the wheel.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved resilient wheel.

Fig. 3 is a cross sectional view taken through the plane of the improved wheel substantially on the line 3—3 of Figure 2.

Figure 1:
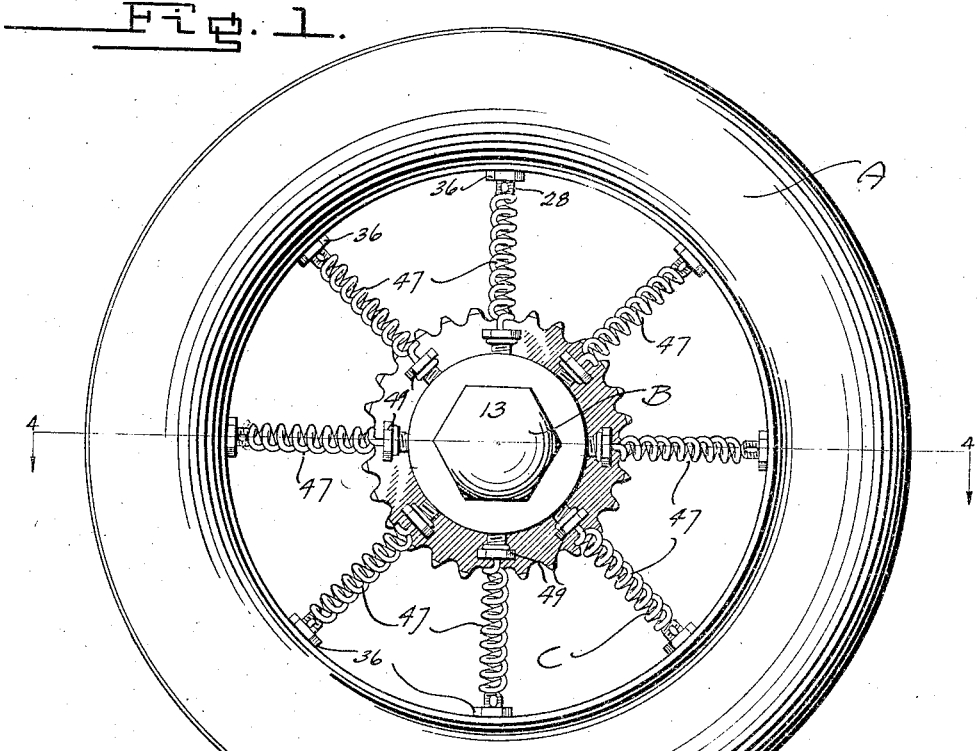
Figure 2:
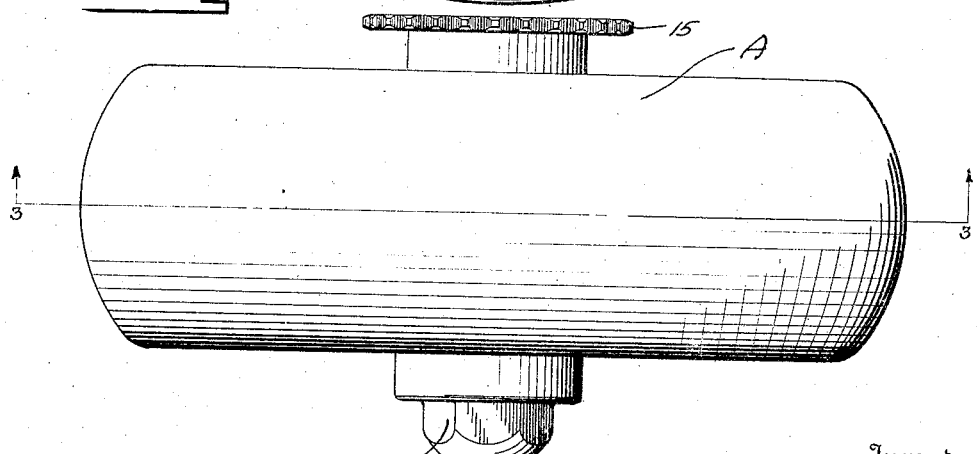
Fig. 2 is a plan view of the improved wheel showing the contour of the tire portion thereof.
Figure 2:
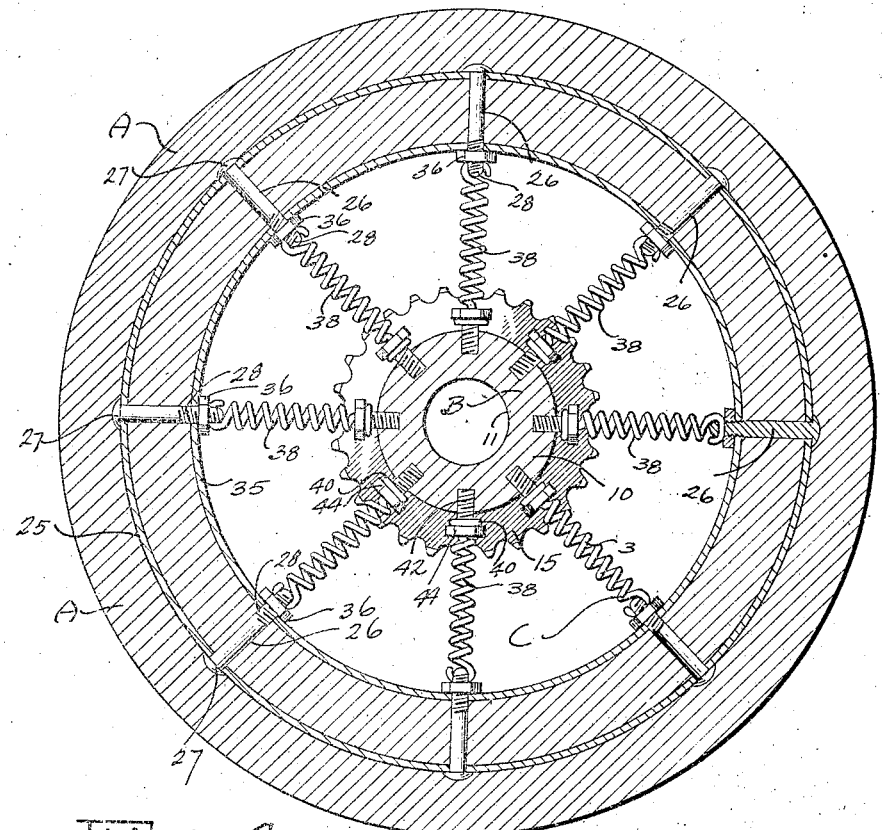
Figure 4:
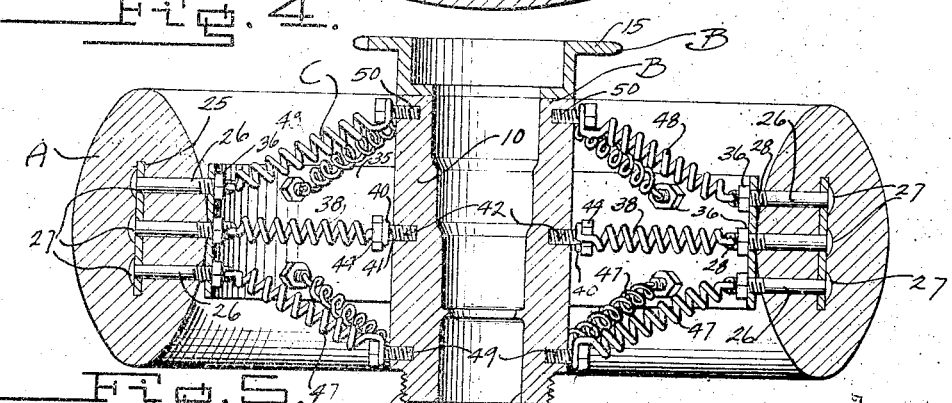
Fig. 4 is a transverse cross sectional view taken through the improved wheel substantially on the line 4—4 of Figure 1.
Figure 5:
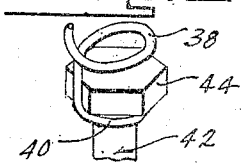
Figure 5 is a perspective view showing the connection of one of the supporting springs to a hub bolt.

In the drawings, wherein for the purpose of illustration is shown but the preferred embodiment of the improved vehicle wheel the letter A may generally designate the tire portion thereof; B the hub portion thereof; and C means for resiliently supporting the hub portion B from tire A.

The tire A of the vehicle wheel is preferably of solid rubber or analogous resilient material, and is preferably elliptical shaped in cross section.

The hub B is preferably of metal construction, and of any formation, by way of example including a body portion 10 defining a spindle receiving passageway 11 therethrough, and an exterior screw threaded end 12 adapted to receive a hub cap 13 or the like. At the inside end of the body 10 an annular sprocket wheel 15 may be formed integral therewith, or any other appropriate means provided for a vehicle wheel which is either adapted for use as a traction wheel or as a steering wheel.

A circular metal band 25 of flexible metal is preferably embedded in the tire A midway between the thickness thereof. This ring shaped band 25 is of such character that the same may flex with the flexing of the tire A, and is polygonal shaped in cross section, being many times wider than the thickness thereof, with the width extending along the major axis of the tire cross section. Spring supporting bolts 26 are provided in embedded relation within the tire A, having the heads 27 thereof resting on the outer side of the ring shaped band 25 and extending radially through apertures in said ring shaped band and through the tire A so that the screw threaded shank ends 28 thereof project radially inwardly of the inner periphery of the tire A. The bolts 26 are preferably supported by the tire A and the band 25 in transverse series of threes in order to cooperate with the support of the springs of the vehicle wheel. An inner metal band 35 of flexible character is supported in abutting relation with the inner periphery of the tire A, having suitable openings therethrough to receive the screw threaded shank ends 28 of the bolts 26 therethrough, so that clamping nuts 36 may be adjusted over the screw threaded ends or shanks 28 to clamp the band 35 in a proper seating relation with said bolts. The ends of the bolts which extend outwardly from the clamping nuts 36 are transversely apertured.

A central series of springs 38 are preferably provided at the central plane of the wheel, with the axes thereof parallel with the plane of the wheel; said springs 38 at their outer ends being connected in the transverse openings in the screw threaded shanks 28 of the middle bolts 26. The inner end of each spring 38 preferably has a convolution 40 thereon which receives therethrough the shank portion 41 of a bolt 42 so that the head 44 of said bolt engages outwardly of said convolution to maintain the spring under tension between the bolts 26 and 42. At one side of the series of springs 38, diagonal springs 47 are provided, and at the opposite side of the spring 38 a second series of diagonally extending springs 48 are provided. The springs 47 and 48 at their outer ends are connected to the transverse openings in the shank ends 28 of the outside bolts 26, and from thence extend in diverging relation for connection to the outside bolts 49 and 50 respectively which are connected to the hub B, and which engage the outside convolutions of the springs 47 and 48 in the same manner as defined by the bolts 42.

From the foregoing description of this invention it is apparent that a resilient wheel has been provided in which the parts are very durably and effectively assembled to support the tire A in a stable yet resilient relation with respect to the hub B. The provision of the oppositely extending diagonal series of springs 47 and 48 acts to keep the wheel tire A from moving laterally with respect to the hub B, and all of the springs, 38, 47, and 48 are under tension to resiliently support the hub structure B from the tire A. The tire A is relatively broad, and is durably and efficiently connected to the springs in such a manner as to permit the proper flexing of the tire without interfering with the action of the springs.

Various changes in the shape, size, and arrangement of parts may be made in the form of invention herein shown and described, without departing from the spirit of this invention or the scope of the claims.

I claim:

1. A resilient wheel comprising a cushion tire portion, a hub portion, a flexible metal band embedded in the tire portion, a series of springs connecting said band to the hub portion with the axes of said springs parallel with the plane of the wheel, and series of springs at each side of said first mentioned series of springs connecting the band of said tire to the hub portion, said last mentioned series of springs at each side of the wheel being diagonally arranged in opposed relation with respect to each other and with respect to the plane of the wheel.

2. A resilient wheel comprising a solid rubber tire, a metal band flexible in character embedded in the rubber tire, bolts carried by said metal band extending radially inwardly through the tire and having exposed shank ends at the inner periphery of said tire, a hub portion, and spring means connecting the inwardly extending ends of said bolts to the hub portion for resiliently supporting the hub portion from the tire.

3. A resilient wheel comprising a tire which includes a resilient rubber body portion, a metal band of flexible character embedded in the body portion, a second metal band of flexible character secured at the inner periphery of the tire, a hub portion, a central series of springs connecting the hub portion to the tire and disposed substantially in a plane parallel with the plane of the wheel, and outside and inside series of springs connecting the hub portion to the tire portion and extending in diverging relation between the tire portion and the hub portion.

4. A resilient wheel comprising a rubber tire, a metal band flexible in character of much greater width than the thickness thereof embedded in the tire, bolts having the head portions thereof engaging said metal band and extending radially inwardly through the tire having screw threaded shank ends extending inwardly of the inner periphery of the tire, a second metal band of flexible character having openings therein through which the screw threaded ends of said bolts extend, nuts for adjustment on said screw threaded ends of said bolts to clamp said second metal band against the inner periphery of said tire, a hub body having radial securing elements outwardly thereon, and central and side series of springs connected at their inner ends to the securing elements of said hub and at their opposite ends to the screw threaded shanks of the bolts of the tire, said side springs extending in a relative diverging relation between the hub and tire portions of the vehicle wheel.

5. In a vehicle wheel the combination of a hub, a cushion tire, a ring of flexible metal embedded in the cushion tire, an inner peripheral rim of flexible metal for the cushion tire, bolt means clamping said embedded ring and inner peripheral rim together so that the inner ends of the bolts extend radially inwardly toward said hub, and spring means connecting said hub and the inner ends of said bolts for resiliently supporting the cushion tire with respect to the hub.

6. A resilient wheel comprising a flexible annular tire portion, a hub adapted for central disposition with respect to said annular tire portion, and a plurality of series of springs constituting the sole means for connecting the annular tire portion to the centrally disposed hub, said plurality of series of springs including one series of springs with the springs thereof arranged so that the axes of the same are in a plane parallel to the plane of the wheel, said plurality of series of springs furthermore including a side series of springs at each side of said first mentioned series of springs, said side series of springs being diagonally arranged with respect to the plane of the wheel, in divergent relation with the springs of the first mentioned series from the tire portion towards the hub, each spring of the series of springs which are disposed in a plane parallel to the wheel having one spring of each of the side series of springs disposed in alignment therewith transversely of the wheel at right angles to the plane of the wheel.

JERÓNIMO SAMSON.